(12) United States Patent
Rinneberg et al.

(10) Patent No.: US 10,198,171 B2
(45) Date of Patent: Feb. 5, 2019

(54) USER INTERFACE CONTROL FOR SMART RANGE SLIDER

(71) Applicant: SAP SE, Walldorf (DE)

(72) Inventors: Thomas Rinneberg, Schriesheim (DE); Markus Ulke, Heidelberg (DE); Jens Henniger, Mannheim (DE); Hans-Peter Schaerges, Mannheim (DE)

(73) Assignee: SAP SE, Walldorf (DE)

( * ) Notice: Subject to any disclaimer, the term of this patent is extended or adjusted under 35 U.S.C. 154(b) by 196 days.

(21) Appl. No.: 15/294,134

(22) Filed: Oct. 14, 2016

(65) Prior Publication Data

US 2018/0107367 A1 Apr. 19, 2018

(51) Int. Cl.
*G06F 3/048* (2013.01)
*G06F 3/0484* (2013.01)
*G06F 3/0488* (2013.01)

(52) U.S. Cl.
CPC ........ *G06F 3/04847* (2013.01); *G06F 3/0488* (2013.01)

(58) Field of Classification Search
None
See application file for complete search history.

(56) References Cited

U.S. PATENT DOCUMENTS

| | | | | |
|---|---|---|---|---|
| 2007/0273659 A1* | 11/2007 | XiaoPing | .............. | G06F 3/0362 345/173 |
| 2008/0120565 A1* | 5/2008 | Stiso | .................. | G06F 3/04847 715/771 |
| 2008/0184167 A1* | 7/2008 | Berrill | ................. | G06F 3/04847 715/833 |
| 2009/0002370 A1* | 1/2009 | Helfman | ................. | G06T 5/009 345/440 |
| 2009/0164886 A1* | 6/2009 | Shah | .................... | G06F 3/04847 715/243 |
| 2010/0306694 A1* | 12/2010 | Conzola | ............. | G06F 3/04847 715/786 |

(Continued)

*Primary Examiner* — Hua Lu
(74) *Attorney, Agent, or Firm* — Sterne, Kessler, Goldstein & Fox P.L.L.C.

(57) ABSTRACT

Disclosed herein are system, method, and computer program product embodiments for specifying a desired range of values. An embodiment operates by displaying a range slider bar on a graphical user interface, and iteratively performing several steps. The steps include receiving a new position for a handle on the range slider bar, wherein the new position specifies a first range of values within a second range of values, partitioning the second range of values into a plurality of sub-ranges, wherein each sub-range comprises two boundary values. The steps further include determining a mapping between a set of accessible positions on the range slider bar and a plurality of values within the second range, wherein, for each sub-range, the difference of values assigned to consecutive accessible positions corresponding to the sub-range increases exponentially when moving from a boundary value of the sub-range to another boundary value of the sub-range. The steps also include, in response to identifying that the first range is identical to the desired range, terminating the iterations. At least one of the displaying, receiving, partitioning, determining, and terminating are performed by one or more computers.

17 Claims, 9 Drawing Sheets

(56) References Cited

U.S. PATENT DOCUMENTS

| | | | |
|---|---|---|---|
| 2011/0258569 A1* | 10/2011 | Weir | G06F 3/04847 715/771 |
| 2012/0137238 A1* | 5/2012 | Abeln | G06F 3/04847 715/771 |
| 2013/0055145 A1* | 2/2013 | Antony | G05B 19/41875 715/781 |
| 2013/0097551 A1* | 4/2013 | Hogan | G06F 3/0488 715/780 |
| 2013/0235070 A1* | 9/2013 | Webb | G09G 5/02 345/594 |
| 2015/0160845 A1* | 6/2015 | Lahtivuori | G06F 3/04842 715/835 |
| 2015/0277718 A1* | 10/2015 | Lauer | G06F 3/04855 715/780 |
| 2015/0331595 A1* | 11/2015 | Ubillos | G06F 3/04855 715/833 |
| 2016/0216873 A1* | 7/2016 | Filippi | G06F 3/04847 |
| 2016/0283866 A1* | 9/2016 | Hasselo | G06Q 10/02 |
| 2017/0357317 A1* | 12/2017 | Chaudhri | G06F 3/0412 |

* cited by examiner

USER INTERFACE CONTROL FOR SMART RANGE SLIDER

BACKGROUND

A graphical user interface control for a "Range Slider" is used in applications for specifying a desired range of values within a (greater) given range, such as a specific time interval within a given period of time. The specified range may be subsequently used as an input/trigger for further functionality such as data processing and/or analysis, e.g., obtaining statistical features of given data, or the calculation of some totals. A problem in specifying a desired range of values using a graphical user interface is that the number of possible values in the greater given range of values may exceed the number of accessible positions available on the range slider. For example, in a 500 pixel-wide user interface control for a two-year range, not all 365*2 dates may be accessible. Additionally, the pixel-accurate movement of slider handles via mouse or finger (on touch-based devices) may be a cumbersome task.

Furthermore, a range slider may be hard to control if the slider handles are close to each other, because the different click-sensitive areas can be close to each other. In some instances, the graphical representation of the slider handles may become so close to each other such that they fully or partially overlap. In these instances, it can be both difficult to select a slider handle, as well as selecting a range in the area between the two slider handles.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a user interface control of a range slider.

Figure 1:
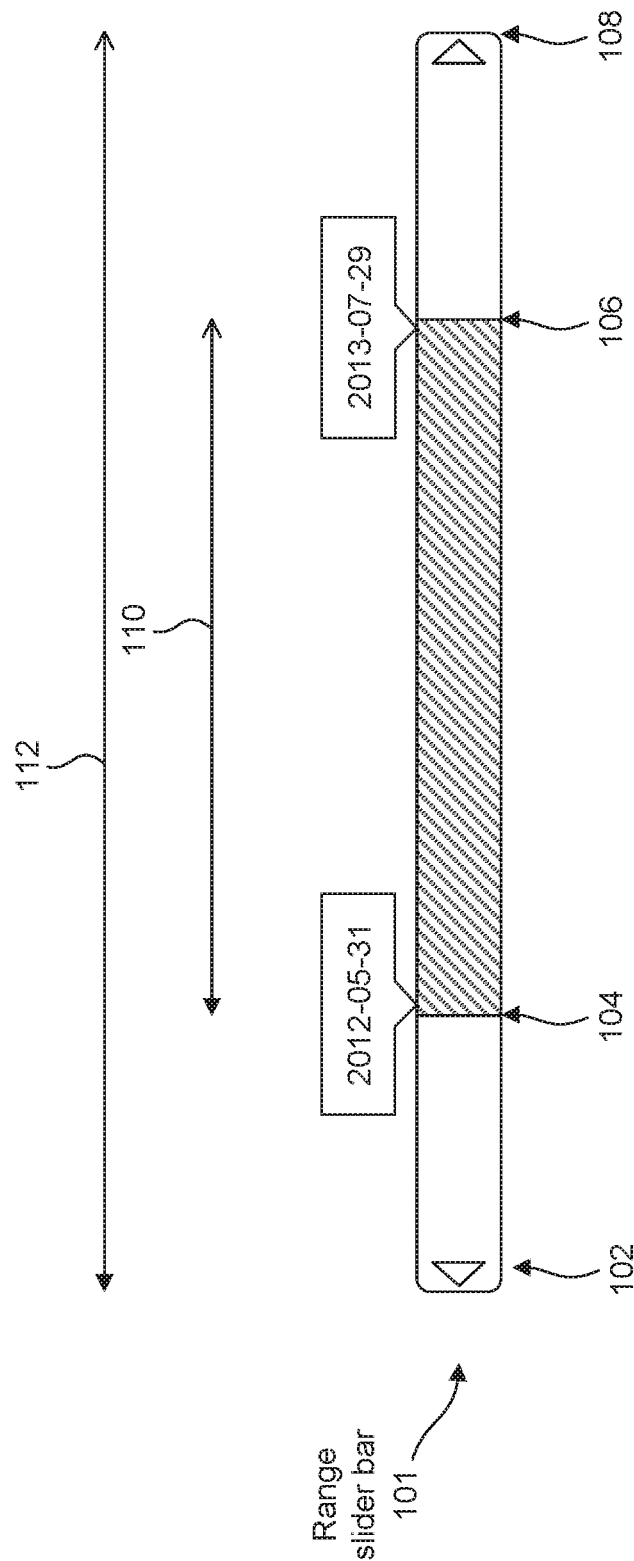
FIG. 1 is an example range slider user interface, according to some embodiments.

FIG. 1 is an example a range slider user interface 100, according to some embodiments. The range slider user interface 100 may be presented to a user. The range slider user interface includes a range slider bar 101. In some embodiments, the range slider bar 101 includes a given range of values 112 determined by minimum and maximum values 102 and 108 respectively.

In some embodiments, the range slider bar 101 includes two handles, such as handles 104 and 106 the positions of which can be changed by the user. A user may adjust the handles 104 and 106 to specify a desired sub-range 110 from range 112. The range of values 112 may, for example, be a span of time, e.g., two years. The sub-range may, for example, be a three-month interval within the range of two years. The range slider user interface 100 is supported by a range slider controller that receives the user's input from range slider user interface 100, and adjusts different parameters of the range slider, e.g., the values indicating the sub-range 110, and the mapping between positions accessible on the range slider user interface and the values these positions represent. This is further described with respect to FIG. 2.

Figure 2:
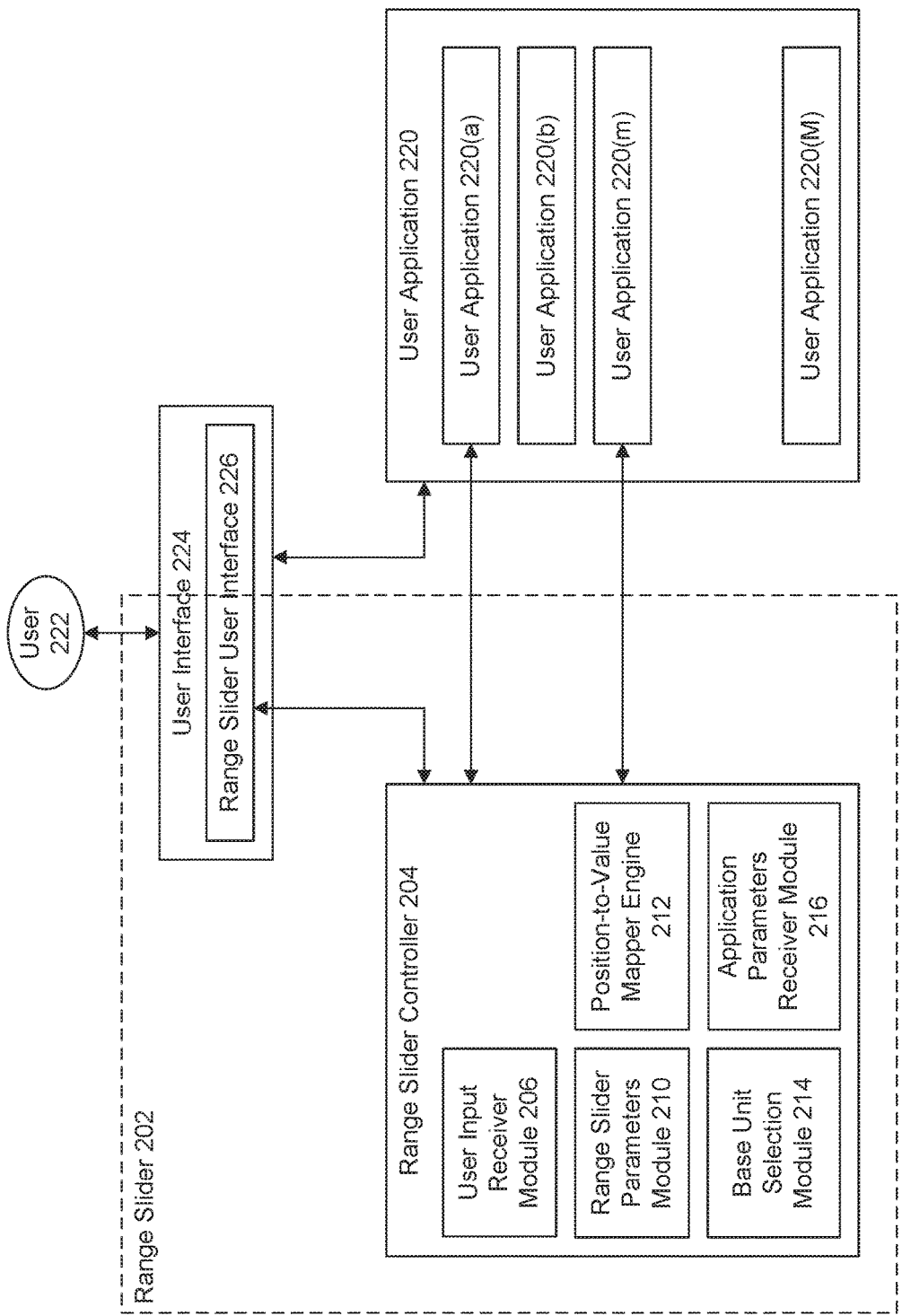
FIG. 2 is a block diagram for an application environment including a range slider user interface and a range slider controller, according to some embodiments.

FIG. 2 is a block diagram for an application environment 200 including a range slider user interface 226 and a range slider controller 204, according to some embodiments. An example of a range slider user interface according to an embodiment is shown in range slider user interface 100 in FIG. 1. A user 222 is provided with a user interface 224. The user may run a variety of applications 220 such as applications 220(a) to 220(M). Any or all of these applications may interact with user interface 224 to receive input parameters from and send output parameters to user 222. Some of these applications, e.g., application 220(a) and 220(m) may require specification of a desired sub-range of values within a range of values. These applications may interact with a range slider 202. For example, application 220(a) may interact with range slider user interface 226 to receive a graphical representation of a sub-range specified by the user (in form of position of one or two handles of the range slider user interface). Additionally, application 220(a) may interact with range slider controller 204 to receive the values corresponding to the selected positions specified by the graphical representation.

In some embodiments, the interaction between an application, such as application 220(a) and range slider 202 may be only via the range slider user interface 226.

In some embodiments, range slider controller 204 includes a user input receiver module 206, a range slider parameters module 210, a position-to-value mapper engine 212, a base unit selection module 214, and an application parameters receiver module 216. These components are described in turn as follows.

User input receiver module 206 receives input parameters such as one or more selected positions on the range slider user interface 226 from user 222. As described above, these selected positions correspond to a sub-range of values, such as sub-range 110, from a greater range of values, such as range 112. The mapping between the selected positions and values represented by the selected positions is determined by position-to-value mapper engine 212. This is described in detail with respect to FIG. 4.

In base unit selection module 214, a base unit is determined and maintained. The values within a value range, e.g., value range 112, may be discrete values, with the difference between two consecutive values being one base unit. For example, if the value range 112 corresponds to a one-month time span, a base unit of 1 second may be used. Accordingly, values within the range have a granularity of one second.

Application parameters receiver module 216 can receive parameters from an application such as application 220(*a*). These parameters may, for example, determine the type of values (e.g., time, weight, or temperature) that are to be selected by range slider 202. Additionally or alternatively, the parameters received from the application may determine the minimum and maximum values of the value range, such as range 112. Additionally or alternatively, the parameters received from the application may determine a minimum acceptable base unit, or a suggested base unit that can be used by range slider 202. Other parameters may additionally or alternatively be received by application parameters receiver module 216 without departing from the scope of the present disclosure.

Figure 3:
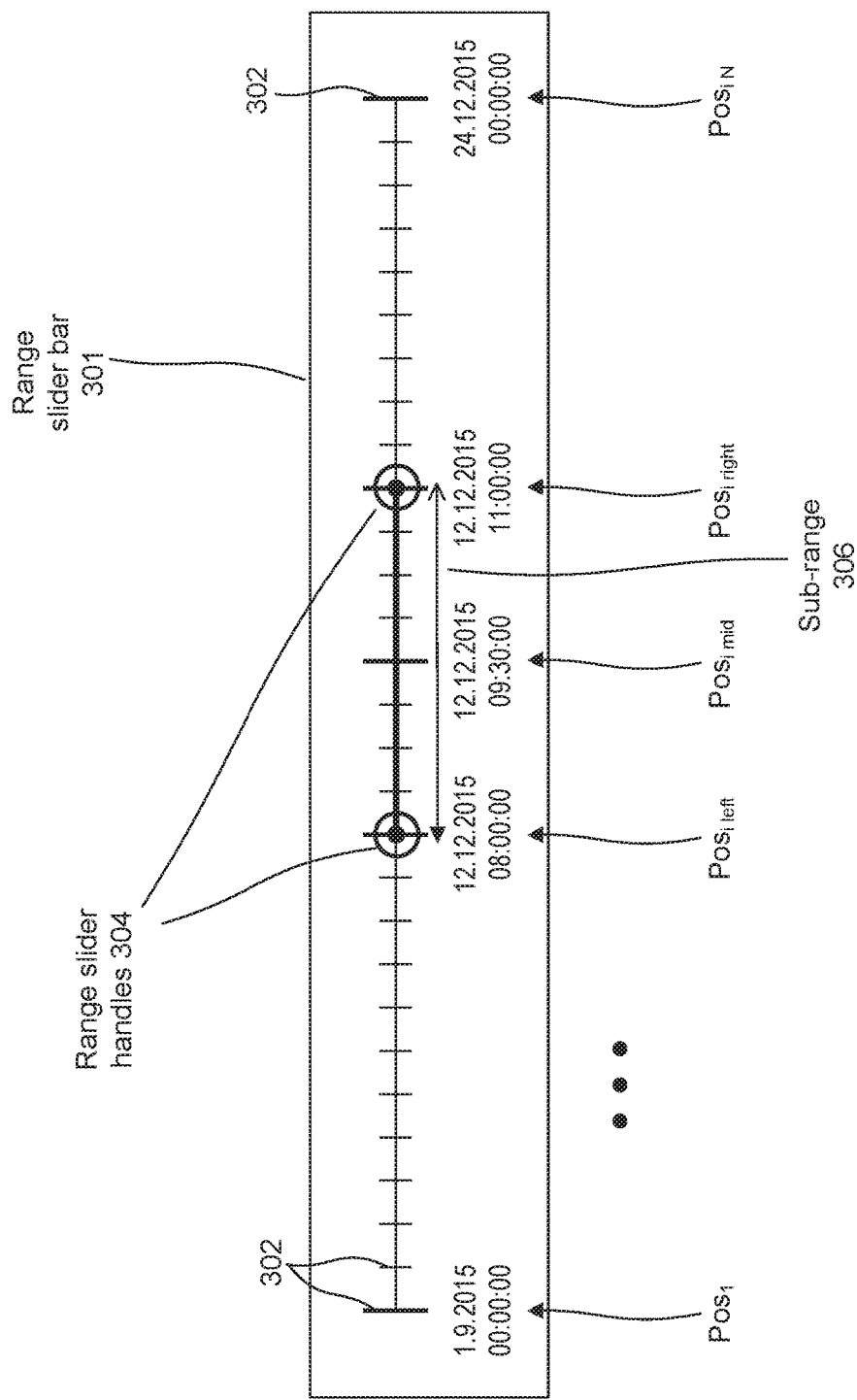
FIG. 3 is a view of an example range slider user interface, according to some embodiments.

FIG. 3 is an example view of a range slider user interface 226, according to some embodiments. In this figure, there are N accessible positions indicated by $Pos_1, Pos_2 \ldots Pos_{i_N}$ in 302. The width of the range slider bar 301 is counted in the number of pixels, and is a natural number herein referred to as "slider width". The range slider bar 301 may include two range slider handles 304 the positions of which can be changed by a user, such as user 222.

In some embodiments, the range slider bar 301 may include two range slider handles 304. A user can use one or two slider handles 304 to adjust the sub-range of values 306 to a desired sub-range. The user can only effectively pose a range slider handle 304 on an accessible position. If the user leaves a range slider handle 304 on a position other than an accessible position, the range slider handle "snaps" to the closest accessible position.

In some embodiments, the accessible positions may be distributed uniformly (equidistantly) along the range slider bar to ensure a reasonable accessibility of each position. Accordingly, in these embodiments, the distance (in number of pixels) between two consecutive accessible positions can be calculated as:

$$Pos_{i+1} - Pos_i = \frac{\text{slider width}}{N-1}; i = 1 \ldots N-1$$

The number and distribution of accessible positions on the range slider bar 301 determines a granularity for positions that can be selected for the range slider handles.

In some embodiments, a maximum for the number N of different accessible positions on the slider range bar 301 can be defined based on external conditions such as the slider width or the device type. For example, for a range slider bar with a slider width of 500 pixels on a mouse-enabled personal computer (PC), up to 100 accessible positions may be considered. In another example, for a touch-based tablet device, in a range slider bar with a width of 500 pixels, 25 accessible positions may be considered instead to make selecting a position easier for the user.

In some embodiments, the number of accessible positions is selected to be much smaller than the pixel-width of the range slider bar. This creates larger snapping zones for accessible positions on the range slider bar 301, and allows for a more relaxed positioning of the range slider handles compared to high-precision sighting.

The current positions of the handles 304 are referred to herein as $Pos_{i_{left}}$ and $Pos_{i_{right}}$. These positions represent values $V_{left}$ and $V_{right}$. The positions accessible on the range slider bar 301 represent values from a value range specified by an interval between values $V_{min}$ and $V_{max}$.

EXAMPLE 1

In a network traffic monitoring application, the instantaneous bandwidth consumption may be monitored for a period (range) of several months, and a base unit of one "second" may be selected. A sub-range within this period may be selected for further analysis. The values for the range and sub-range may be as follows:
$V_{min}$="Sep. 1 2015 00:00:00 AM"
$V_{max}$="Dec. 24 2015 00:00:00 AM"
$V_{left}$="Dec. 12 2015 08:00:00 AM" (initially)
$V_{right}$="Dec. 12 2015 11:00:00 AM" (initially) □

In some embodiments, the values $V_{min}$, $V_{left}$, $V_{right}$, and $V_{max}$ are represented by accessible positions and correspond to $Pos_1$, $Pos_{i_{left}}$, $Pos_{i_{right}}$ and $Pos_N$. Additionally, in some embodiments, $V_{mid}$, the average of value $V_{left}$ and $V_{right}$ is also represented by an accessible position $Pos_{i_{mid}}$.

In some embodiments, the range of values ValueSet= $[V_{min}, V_{max}]$ may be partitioned into four sub-ranges including $ValueSet_{left}=[V_{min}, V_{left}]$, $ValueSet_{min-left}=[V_{left}, V_{mid}]$, $ValueSet_{mid-right}=[V_{mid}, V_{right}]$, and $ValueSet_{right}=[V_{right}, V_{max}]$. Each of these sub-ranges is represented by a subset of accessible positions on a range slider bar, such as range slider bar 301, namely $[Pos_1, Pos_{i_{left}}]$, $[Pos_{i_{left}}, Pos_{i_{mid}}]$, $[Pos_{i_{mid}}, Pos_{i_{right}}]$ and $[Pos_{i_{right}}, P_N]$ respectively. Herein, the above sets of accessible positions are referred to as $PosSet_{left}$, $PosSet_{mid-left}$, $PosSet_{mid-right}$ and $PosSet_{right}$ respectively.

In some embodiments, the range of values ValueSet= $[V_{min}, V_{max}]$ may be partitioned to a different number of sub-ranges.

In some embodiments, any subset of accessible positions, $PosSet_x$ may be mapped to a $ValueSet_x$ in a way that a "minimal" position change of a range slider handle, such as range slider handle 304, (i.e. moving the handle to an adjacent possible position) results in a change of the corresponding value of only one base unit. If we move the handle further in the same direction, the difference of the values represented by adjacent accessible positions is increased by a constant factor (thus growing exponentially) until we arrive at the special possible position that is the other limit of the $PosSet_x$.

In an embodiment, calculating the constant factor, a number N that does not exceed a reasonable maximum value $N_{max}$, and the values for $Pos_{i_{left}}$ and $Pos_{i_{right}}$ may be based on the method of 400 of FIG. 4, as will be described shortly.

Figure 4:
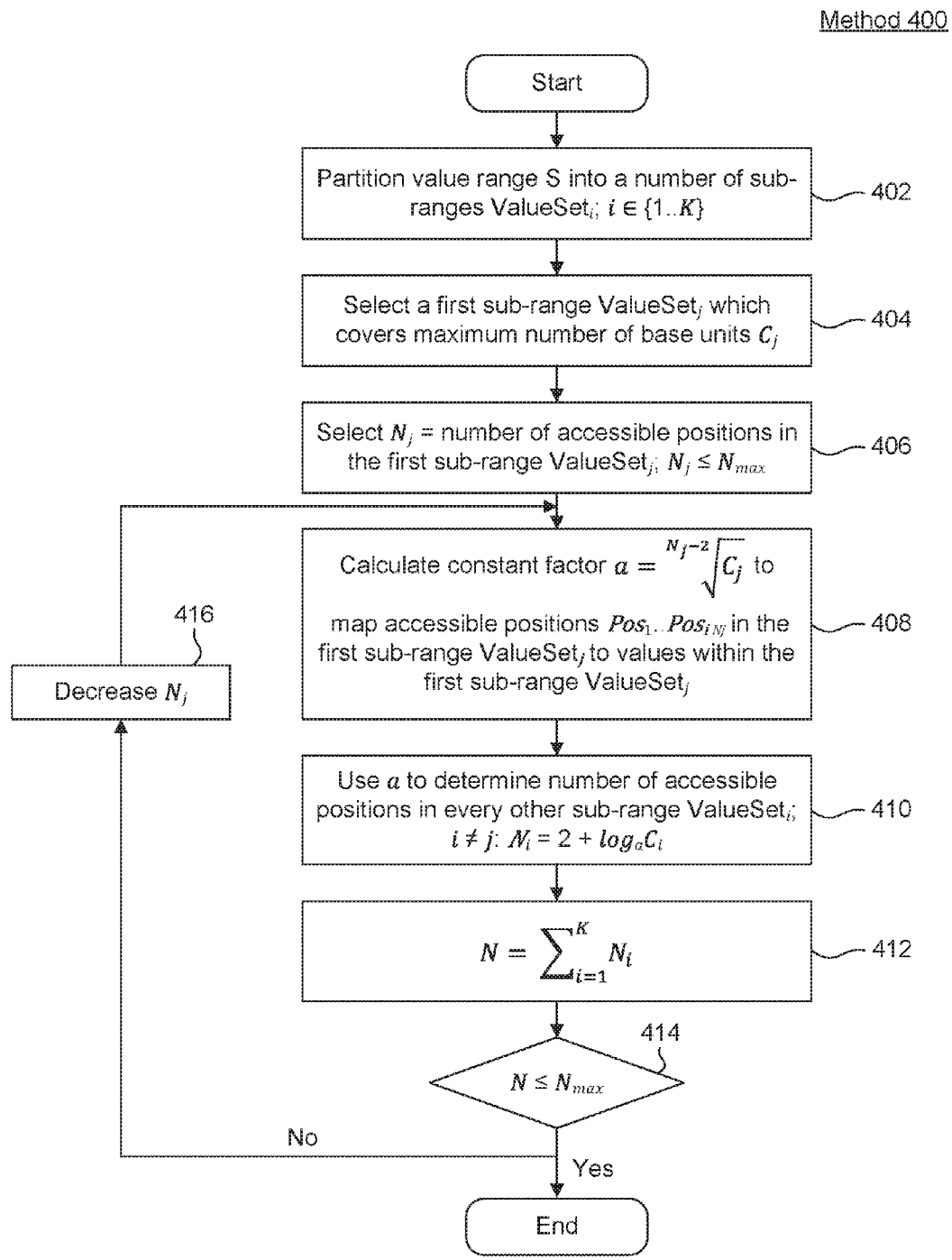
FIG. 4 is a flowchart illustrating a process for controlling a range slider, according to some embodiments.

FIG. 4 is a flowchart 400 illustrating a process for controlling a range slider, such as range slider 202, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

In 402, a given value range ValueSet is partitioned into a number of sub-ranges $ValueSet_i$; $i \in \{1 \ldots K\}$.

In 404, a first sub-range $ValueSet_j$ is selected from these sub-ranges, such that the first sub-range covers the maximum number of base units $C_j$ among all the specified sub-ranges.

In 406, a number of accessible positions $N_j$ in the first sub-range is specified such that $N_j \leq N_{max}$. In an example, $N_j$ is initially selected to be $N_{max}$. However, other initial values may be selected alternatively.

In 408, a mapping between the $N_j$ accessible positions PosSet$_j$ and the values within ValueSet$_j$ they represent is performed such that a minimal position change of a range slider handle (i.e. moving it to an adjacent possible position) results in a change of the according value of only one base unit. If we move the range slider handle further in the same direction, the difference of the values represented by adjacent accessible positions is increased by constant factor a (thus growing exponentially) until we arrive at the special possible position that is the other limit of the PosSet$_j$. To better clarify such a mapping, a numerical example is presented below:

EXAMPLE 2

Assume the value range and sub-ranges are those presented in Example 1. Further, assume that $N_{max}=30$. The largest value set ValueSet$_j$ (the value set covering the most base units) may be ValueSet$_{left}$=["Sep. 1 2015 00:00:00 AM ","Dec. 12 2015 08:00:00 AM"] representing a span of 8,845,200 base units (seconds).

Initially, it is assumed that PosSet$_{left}$ has 30 members, i.e., $N_{left}=30$. To obtain an exponential mapping from PosSet$_{left}$ to ValueSet$_{left}$ that starts at $V_{left}$, we have
Pos$_{30}$→"Dec. 12 2015 08:00:00 AM"
Pos$_{29}$→"Dec. 12 2015 08:00:00 AM"−1 second
Pos$_{28}$→"Dec. 12 2015 08:00:00 AM"−a×1 second
Pos$_{27}$→"Dec. 12 2015 08:00:00 AM"−a$^2$×1 second
( ... )
Pos$_1$→"Dec. 12 2015 08:00:00 AM"−a$^{28}$×1 second (="Sep. 1 2015 00:00:00 AM")

Accordingly, the constant factor a is calculated by $$a = \sqrt[28]{8,845,200} \approx 1.77.$$

Note that for the final mapping, the values calculated above to be represented by accessible positions are to be rounded according to the base unit. □

Returning to FIG. 4, in 408, the constant factor a is calculated as $$a = \sqrt[N_j-2]{C_j}.$$

In 410, the constant factor a obtained in 408 is used to calculate the number of accessible positions in value sets other than ValueSet$_j$. This is done by counting the number of base units each of these value sets covers, i.e., $C_i$; $i \in \{1 \ldots K\}$, $i \neq j$. The number of accessible positions $N_i$ in ValueSet$_i$ is calculated as the smallest natural number bigger than or equal to $\log_a C_i + 2$.

In the following numerical example, the accessible positions for the other value sets are calculated.

EXAMPLE 3

Using the constant factor a calculated in Example 2, the values corresponding to accessible positions in PosSet$_{mid-left}$, PosSet$_{mid-right}$, and PosSet$_{right}$ can also be calculated as follows:
(1) PosSet$_{mid-left}$=["Dec. 12 2015 08:00:00 AM ","Dec. 12 2015 09:30:00 AM"]
representing a span of 5,400 base units.
The number of accessible positions in PosSet$_{mid-left}$ is calculated as the smallest natural number bigger than or equal to $\log_a 5,400 \approx 15.04$ plus two, i.e., 18. This number together with the constant factor is used to obtain the mapping:
Pos$_{30}$→"Dec. 12 2015 08:00:00 AM"
Pos$_{31}$→"Dec. 12 2015 08:00:00 AM"+1 second
Pos$_{32}$→"Dec. 12 2015 08:00:00 AM"+a×1 second
( ... )
Pos$_{46}$→"Dec. 12 2015 08:00:00 AM"+a$^{15}$×1 second
Pos$_{47}$→"Dec. 12 2015 09:30:00 AM" (The last interval is covering the remaining base units)
(2) PosSet$_{mid-right}$=["Dec. 12 2015 09:30:00 AM","Dec. 12 2015 11:00:00 AM"]
representing a span of 5,400 base units.
The number of accessible positions in PosSet$_{mid-right}$ is calculated as the smallest natural number bigger than or equal to $\log_a 5,400 \approx 15.04$ plus two, i.e., 18. This number together with the constant factor is used to obtain the mapping:
Pos$_{64}$→"Dec. 12 2015 11:00:00 AM"
Pos$_{63}$→"Dec. 12 2015 11:00:00 AM"−1 second
Pos$_{62}$→"Dec. 12 2015 11:00:00 AM"a×1 second
( ... )
Pos$_{48}$→"Dec. 12 2015 11:00:00 AM"−a$^{15}$×1 second
Pos$_{47}$→"Dec. 12 2015 09:30:00 AM"
(3) The number of accessible positions in PosSet$_{right}$=["Dec. 12 2015 11:00:00 AM ","Dec. 24 2015 00:00:00 AM"] (representing a span of 997,200 base units) is calculated as the smallest natural number bigger than or equal to $\log_a 997,200 \approx 24.18$ plus two, i.e., 27. This number together with the constant factor is used to obtain the mapping:
Pos$_{64}$→"Dec. 12 2015 11:00:00 AM"
Pos$_{65}$→"Dec. 12 2015 11:00:00 AM"+1 second
Pos$_{66}$→"Dec. 12 2015 11:00:00 AM"+a×1 second
( ... )
Pos$_{89}$→"Dec. 12 2015 11:00:00 AM"+a$^{24}$×1 second
Pos$_{90}$→"Dec. 24 2015 00:00:00 AM" (The last interval is covering the remaining base units)

Therefore, using the above calculations based on $N_{left}=30$, a PosSet$_{accessible}$ with 90 members is obtained which is greater than $N_{max}=30$. Again, for the final mapping, the values calculated above to be represented by accessible positions first need to be rounded according to the base unit. □

Returning to FIG. 4, in 412, N, the sum of accessible positions computed for all identified sub-ranges is calculated. In 414, this sum is compared to $N_{max}$. If it happens that $N \leq N_{max}$, method 400 terminates. Otherwise, in 416, the value of $N_j$ is decreased and steps 408-414 are repeated. $N_j$ may be simply decremented by one at each iteration, or decreased differently, e.g., by multiplying it by a constant factor smaller than 1, and rounding the resulting value. Alternative methods of decreasing $N_j$ are also possible according to embodiments.

At the end of method 400, a total number of accessible positions for PosSet$_{accessible}$ is obtained that is less than or equal to $N_{max}$. Additionally, a mapping between the accessible positions and the values they represent in the range of $[V_{min}, V_{max}]$ can be calculated, using calculations similar to those shown in Examples 2 and 3.

Note that the values calculated to be represented by accessible positions need to be rounded according to the base unit. Consequently, a set of N accessible positions is obtained (allowing a supporting "snapping" of the mouse pointer) representing N possible values that are now accessible via moving a range slider handle such as range slider handles 304.

At the end of movement of a range slider handle, the non-linear mapping between accessible positions and the values they represent is defined again and executed again, resulting in a new, adapted projection of (eventually changed) members of the value set to a change set of accessible positions. For example, after having moved one of the range slider handles, e.g., the left handle, the value of $V_{left}$ is changed to a new value. If the value of $V_{left}$ is not the desired value intended by the user, the above calculations need to be repeated to recalculate the mapping, and re-render the control. In embodiments, at each re-rendering, the values corresponding to the current position of the range slider handles can be displayed on the screen. Additionally, at each re-rendering, the new mapping between the new accessible positions and their corresponding values (calculated using method 400) are displayed. This process is repeated in multiple steps until both range slider handles point to accessible positions on the range slider bar that represent any desired values for $V_{left}$ and $V_{right}$ that reside in the interval $[V_{min}, V_{max}]$.

Parameter $N_{max}$ is a design parameter. This parameter may be selected considering the platform in which the user interface is accessed. For example, when using a user interface controlled by a mouse (e.g., on a PC), the user has more control over the selection of positions on the range slider bar compared to when a user interface is touch-based (e.g., on a tablet). Therefore, in a mouse-based user interface, a higher value for $N_{max}$ may be selected compared to a touch-based user interface. As an example, $N_{max}$ may be selected as 100 in a mouse-based user interface, and 30 in a touch-based user interface. Additionally, given a specific platform, increasing the value of $N_{max}$ can provide more accessible positions and therefore more corresponding values, allowing the user to reach the desired range in less number of steps on average. On the other hand, increasing the value of $N_{max}$ can make the snapping of the mouse pointer much less useful, and the selection of a certain value to require more manual precision and user difficulty. Therefore, a good choice of $N_{max}$ is important for a satisfying a balance between user interaction ease and range slider's effectiveness (in terms of the number of steps required) in selecting a sub-range of values in $[V_{min}, V_{max}]$.

EXAMPLE 4

Continuing on Example 3, the assumed number of elements of $PosSet_{left}$ is decreased iteratively until $N_{left}=10$. Using this number, a $PosSet_{accessible}$ with 30 members is obtained which is not greater than $N_{max}=30$, and therefore yields in the desired mapping between accessible positions and values. This is shown below:

The constant factor is calculated by $$a = \sqrt[8]{8{,}845{,}200} \approx 7.38.$$

The number of accessible positions in $PosSet_{mid\text{-}left}$ is calculated as the smallest natural number bigger than or equal to $\log_a 5{,}400 \approx 5\ 4.30$ plus two, i.e., 7. Additionally, the number of accessible positions in $PosSet_{mid\text{-}right}$ is also calculated as the smallest natural number bigger than or equal to $\log_a 5{,}400 \approx 4.30$ plus two, i.e., 7. Furthermore, the number of accessible positions in $PosSet_{right}$ is calculated as the smallest natural number bigger than or equal to $\log_a 997{,}200 \approx 6.91$ plus two, i.e., 9.

The following values are then obtained for $PosSet_{accessible}$:

$Pos_1 \to$ "Dec. 12 2015 08:00:00 AM"$-a^8 \times 1$ second $(=$"Sep. 1 2015 00:00:00 AM"$)$
$(\ldots)$
$Pos_8 \to$ "Dec. 12 2015 08:00:00 AM"$-a \times 1$ second
$Pos_9 \to$ "Dec. 12 2015 08:00:00 AM"$-1$ second
$Pos_{10} \to$ "Dec. 12 2015 08:00:00 AM"
$Pos_{11} \to$ "Dec. 12 2015 08:00:00 AM"$+1$ second
$Pos_{12} \to$ "Dec. 12 2015 08:00:00 AM"$+a \times 1$ second
$(\ldots)$
$Pos_{15} \to$ "Dec. 12 2015 08:00:00 AM"$+a^4 \times 1$ second
$Pos_{16} \to$ "Dec. 12 2015 09:30:00 AM" (The last interval is covering the remaining base units)
$Pos_{17} \to$ "Dec. 12 2015 11:00:00 AM"$-a^4 \times 1$ second
$(\ldots)$
$Pos_{20} \to$ "Dec. 12 2015 11:00:00 AM"$-a \times 1$ second
$Pos_{21} \to$ "Dec. 12 2015 11:00:00 AM"$-1$ second
$Pos_{22} \to$ "Dec. 12 2015 11:00:00 AM"
$Pos_{23} \to$ "Dec. 12 2015 11:00:00 AM"$+1$ second
$Pos_{24} \to$ "Dec. 12 2015 11:00:00 AM"$+a \times 1$ second
$(\ldots)$
$Pos_{29} \to$ "Dec. 12 2015 11:00:00 AM"$+a^6 \times 1$ second
$Pos_{30} \to$ "Dec. 24 2015 00:00:00 AM" (The last interval is covering the remaining base units)

As can be seen, the $PosSet_{accessible}$ has now 30 members which is not greater than $N_{max}=30$. Accordingly, method 400 terminates.

In an embodiment, at this point, the values calculated above to be represented by accessible positions are rounded according to the base unit. Consequently, a set of 30 accessible positions is obtained (allowing a supporting "snapping" of the mouse pointer) representing 30 possible values that are now accessible via moving a range slider handle. After having moved one of the range slider handles, e.g., the left handle, the value of $V_{left}$ is changed to a new value. Therefore, the above calculations need to be repeated to recalculate the mapping, and re-render the control until both range slider handles point to accessible positions on the range slider bar that represent the desired values for $V_{left}$ and $V_{right}$. □

Figure 5:
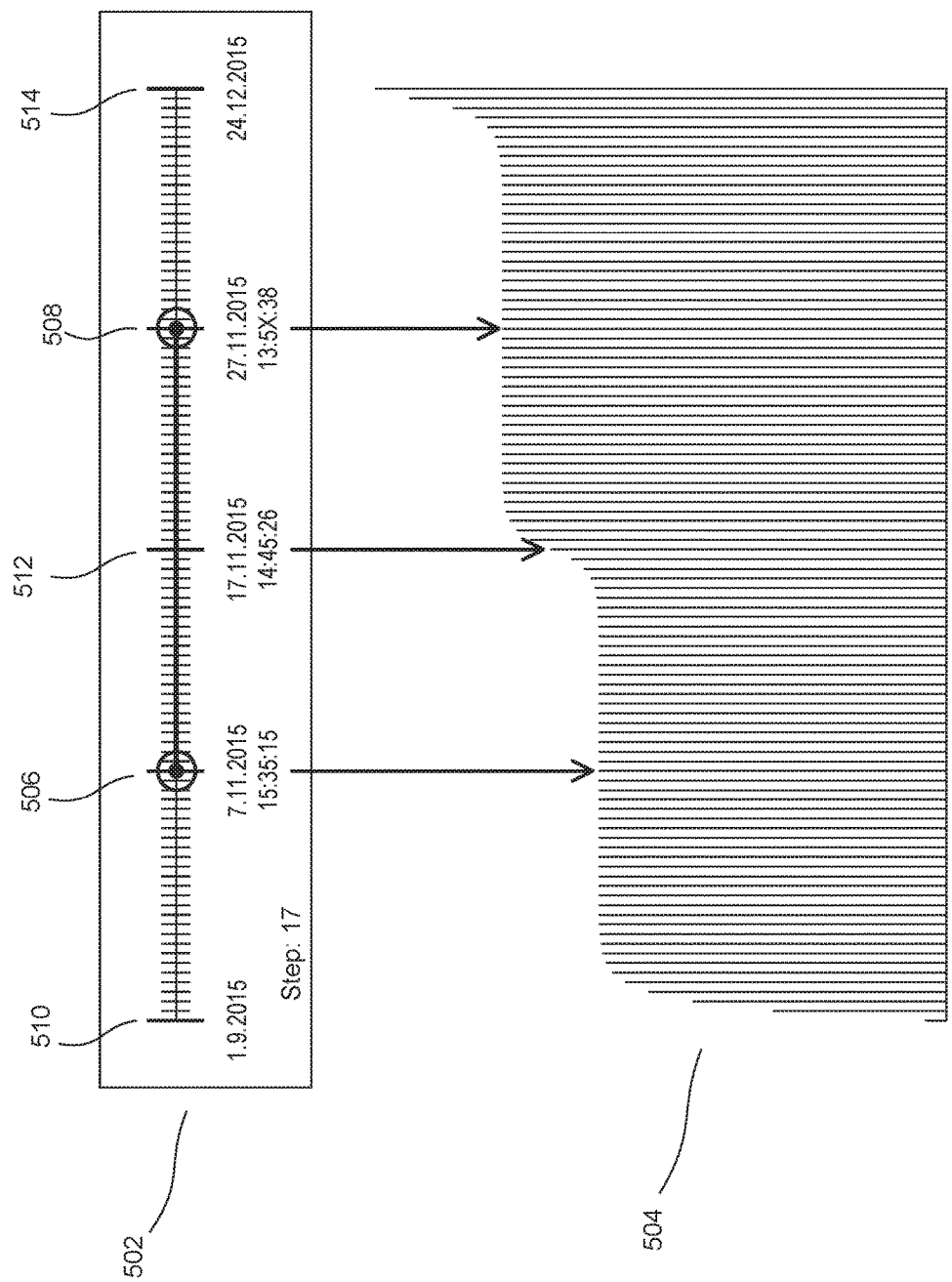
FIG. 5 is an example exponential mapping between accessible positions on a range slider bar and values represented by the accessible positions, according to an embodiment.

FIG. 5 is an example exponential mapping between accessible positions $PosSet_{accessible}$ on range slider bar 502 of a range slider user interface (such as range slider user interface 226) and the values 504 represented by the accessible positions, according to some embodiments. As can be seen, the mapping meets the objective that any subset of accessible positions, $PosSet_x$, is mapped to a $ValueSet_x$ in a way that a "minimal" position change of a range slider handle 506 or 508 from its current position $Pos_{left}$ or $Pos_{right}$, by moving it to an adjacent possible position, results in a change of the represented value by only one base unit. If we move the handle 506 or 508 further in the same direction, the difference of the values represented by adjacent accessible positions increases exponentially (by the computed constant factor) until we arrive at the special possible position that is the other limit of the $PosSet_x$. Note that $Pos_{min}$ 510, $Pos_{max}$ 514, and $Pos_{mid}$ 512 do not correspond to current positions of the range slider handles, and a minimal position change at these positions results in a change of the corresponding value that can amount to an exponentially greater value than one base unit as was shown in Examples 2-4.

Figure 6:
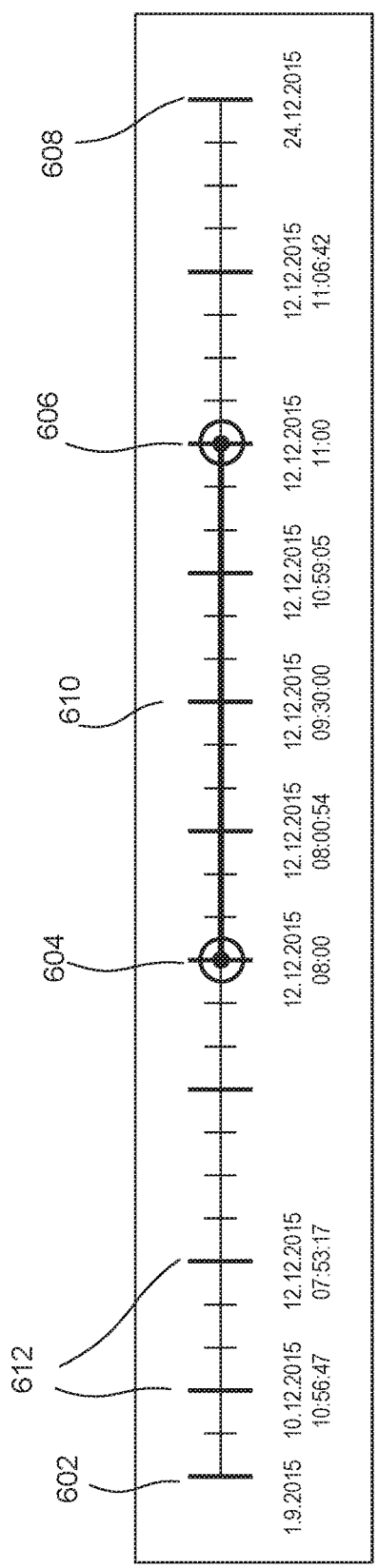
FIG. 6 is an example view of a range slider user interface, according to some embodiments.

FIG. 6 shows an example view of a range slider user interface 226, according to some embodiments.

In FIG. 6, a range slider user interface 226 is shown according to an embodiment wherein the values corresponding to accessible positions on the range slider bar not only include values corresponding to $Pos_{min}$ 602, $Pos_{max}$ 606, and $Pos_{mid}$ 610, $Pos_{left}$ 604, and $POS_{right}$ 608, they also include additional labels such as those shown at positions 612 that specify values represented by other accessible positions. In FIG. 1, a range slider user interface was shown wherein only the values corresponding to range slider handles were depicted. If the mapping between the accessible positions and the values they represent is linear, a user (such as user 222) may be able to guess how far to move the handles to select her desired sub-range. However, in embodiments where, such as those described with respect to FIGS. 4-5 and Examples 2-4, this mapping is not linear, these additional labels can help the user move the range slider handles more informatively with less surprises, and reach the desired sub-range in less number of steps.

In some embodiments, once the mapping between accessible positions and the values they represent in range [$V_{min}$, $V_{max}$] is performed, as described with respect to method 400 in FIG. 4, the values are not rounded to the closest base unit. Instead these values are rounded based on their distance to their direct neighbor, i.e., based on the difference in the value represented by the adjacent accessible position. For example, if the values in [$V_{min}$, $V_{max}$] specify time instances, and the difference between the value obtained corresponding to $Pos_i$ is approximately 11 minutes different from the value obtained corresponding to $Pos_{i-1}$, the value obtained for $Pos_i$ may be rounded in 10 minute units instead of the base unit. As a numeric example, 8:12:17.45 on a specific day in range [$V_{min}$, $V_{max}$] may be rounded to 8:10:00 (instead of rounded to 8:12:17 if it is rounded to the closest base unit). In some embodiments, there may be a pre-specified set of base unit values in which the rounding is performed, e.g., a set consisting of 1 Second, 5 Seconds, 10 Seconds, 30 Seconds, 1 minute, and 10 minutes. When the mapping between accessible positions and their values based on method 400 is performed using the above rounding scheme, the method can be referred to as a "near-logarithmic" mapping.

As described previously with respect to FIG. 4, a good choice for $N_{max}$ is important for a satisfying a balance between user interaction ease and range slider's effectiveness (in terms of the number of steps required) in selecting a sub-range of values in [$V_{min}$, $V_{max}$].

In some embodiments, to keep the snap feature, a low number of (primary) accessible positions $N_{max}$ is selected, but some additional (secondary) accessible positions are also introduced between two adjacent primary accessible positions. The number of the additional accessible positions may be individually calculated with respect to a variety of factors such as the value of $N_{max}$, the available space between the bordering (primary) accessible positions, the rounding applied to the possible values corresponding to the bordering accessible positions, and the value distance between the possible values corresponding to the bordering accessible positions.

Figure 7:
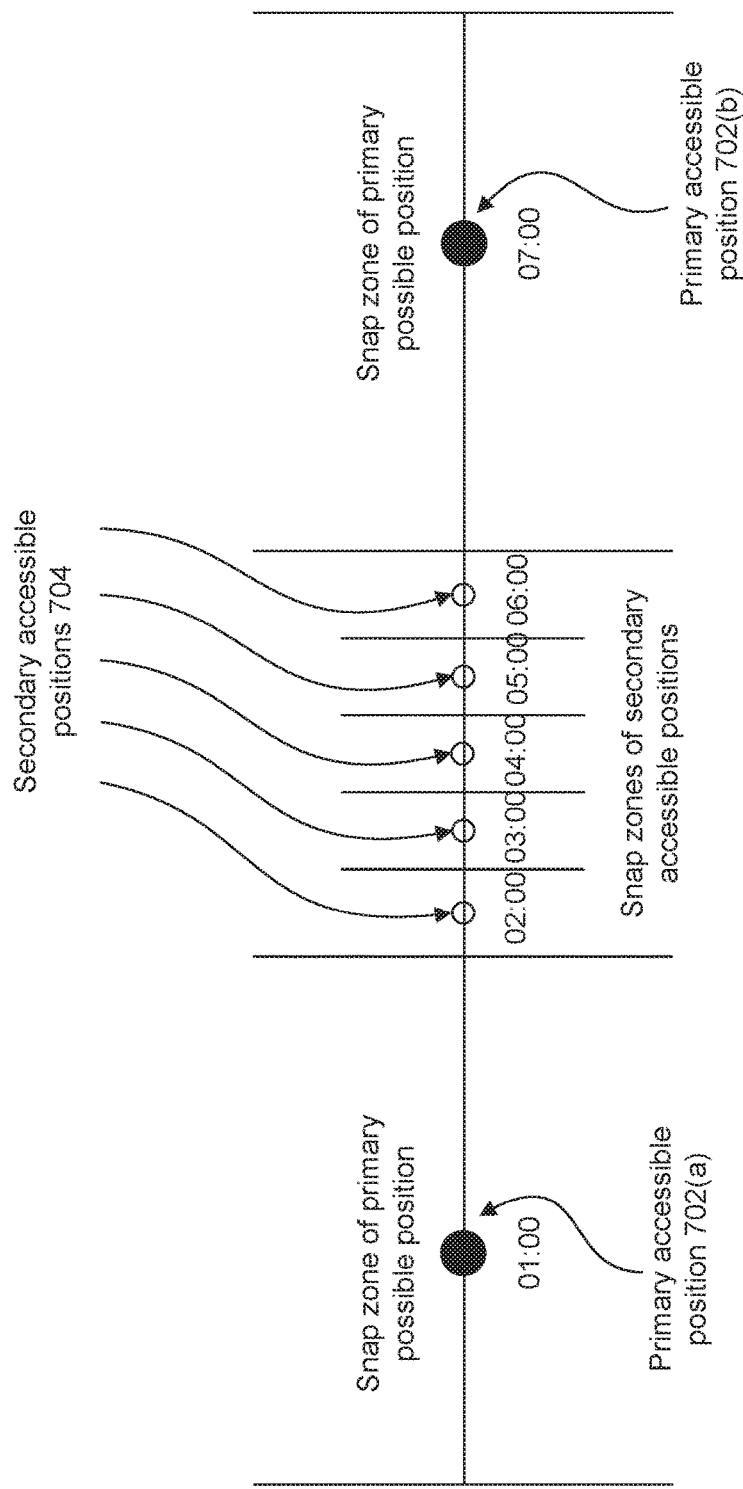
FIG. 7 is an example view of a range slider user interface, according to some embodiments.

FIG. 7 shows an example view of a range slider user interface, such as range slider user interface 226, according to some embodiments where, between adjacent primary accessible positions such as 702(*a*) and 702(*b*), secondary accessible positions 704 are introduced. The specific labels shown in FIG. 7 correspond to Example 5, presented in the following:

EXAMPLE 5

Assume the values of the bordering accessible positions have been rounded to the full hour and are "Dec. 12 2015 01:00:00 AM" and "Dec. 12 2015 07:00:00 AM". Then, it is reasonable to have 5 additional (secondary) accessible positions corresponding to the values "Dec. 12 2015 02:00:00 AM", "Dec. 12 2015 03:00:00 AM", "Dec. 12 2015 04:00:00 AM", "Dec. 12 2015 05:00:00 AM", and "Dec. 12 2015 06:00:00 AM".

In these embodiments, the secondary accessible positions are not distributed equidistantly between the bordering primary accessible positions (i.e., the full interval), but only in a centered portion of the interval, thus giving the primary accessible positions a reasonable space to allow user-friendly snapping.

Note that in FIG. 7, the first interval left or right of either range slider handle (co-located with primary accessible positions 702(*a*) and 702(*b*)) does not contain secondary possible position because this interval is already representing a distance of just one base unit. Therefore the user can have a relaxed start of the handle movement without having a value change caused by a shaky hand.

In some embodiments, the size of the base unit can be changed dynamically. That is, if the base unit size is chosen to be small, the initial range [$V_{min}$, $V_{max}$] can cover a great number of possible values within the range. This can in turn cause very high constant factor a that is calculated using method 400 in FIG. 4. But if the range between the two range slider handles has a certain size, e.g., several days, the user may not be interested in changes in "seconds" in many use cases. In these cases, the base unit can be dynamically adjusted to a reasonable size (e.g., 10 minutes or 1 hour) depending on the difference in values represented at the position of the two range slider handles. Such dynamic change in base unit may take place after one step of range slider handle position adjustment has completed and before the re-rendering takes place.

In some embodiments, to give a user a cue for the non-linear mapping between accessible positions and their corresponding values, the adjacent accessible positions are displayed in a non-equidistant fashion. That is, an exponential projection is applied to spread the accessible positions and resize the results to the available horizontal space. The exponential factor b used for that projection is derived from the original exponential factor a used for the mapping of the values as described with respect to FIGS. 4-5 and Examples 2-4. For example, the exponential factor b may be calculated as $a^{3/N_{max}}$. However, other methods of calculating b are also possible according to some embodiments. Therefore, a steeper incline of the possible value difference corresponding to adjacent accessible positions implies a stronger spreading of the accessible positions on a range slider bar.

Figure 8:
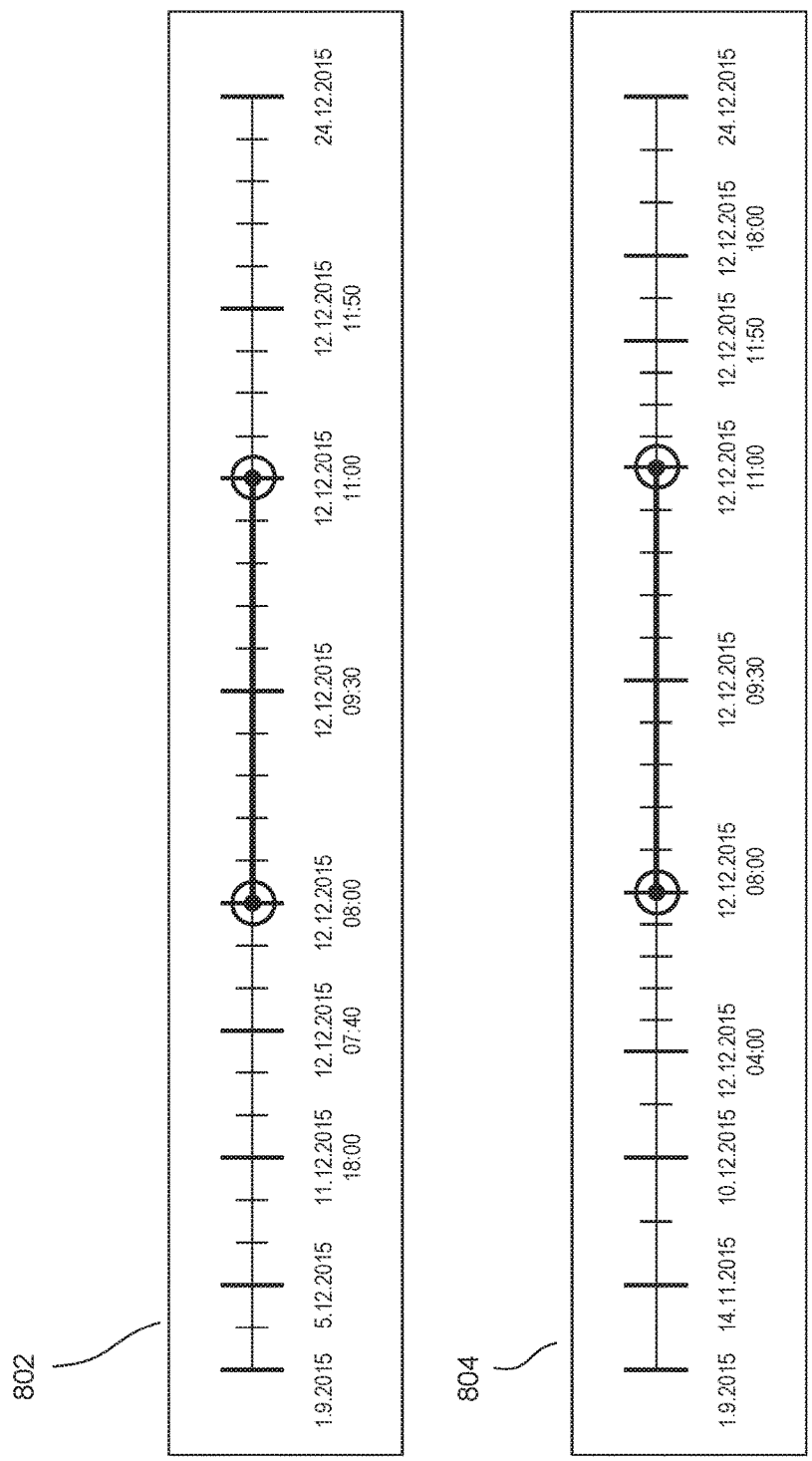
FIG. 8 shows example views of a range slider user interface displaying accessible positions with and without spreading, according to some embodiments.

FIG. 8 is an example view of a range slider user interface 226 wherein accessible positions are displayed with and without spreading, according to some embodiments.

As can be seen in FIG. 8, the upper view 802 depicts a range slider bar with equidistant accessible positions. The lower view 804 depicts a range slider bar with non-linear spreading using a spreading factor b≈1.15.

In some users' view, the non-linear distribution of values may limit the usefulness of the labels and create surprises about the value of the non-labeled positions. Therefore, in some embodiments, in addition to the displaying the value corresponding to the range slider handles, additional labels are displayed to make the user's interaction with the range slider bar easier.

Users may not be mentally prepared to see a re-rendering after adjusting the position of the range slider handles. Specifically, a sudden change of the scale immediately after releasing a range slider handle (including the change of the slider position itself) may create an unpleasant surprise for a user.

In some embodiments, to address this issue, an additional interaction (a button-click) is added to a range slider user interface, such as range slider user interface 226. In these embodiments, once the user adjusts the position of a range slider handle, she/he can view the position of the handles in the current scale. If the user is not satisfied with the chosen range, the user may decide to activate re-rendering using the button click.

Figure 9:
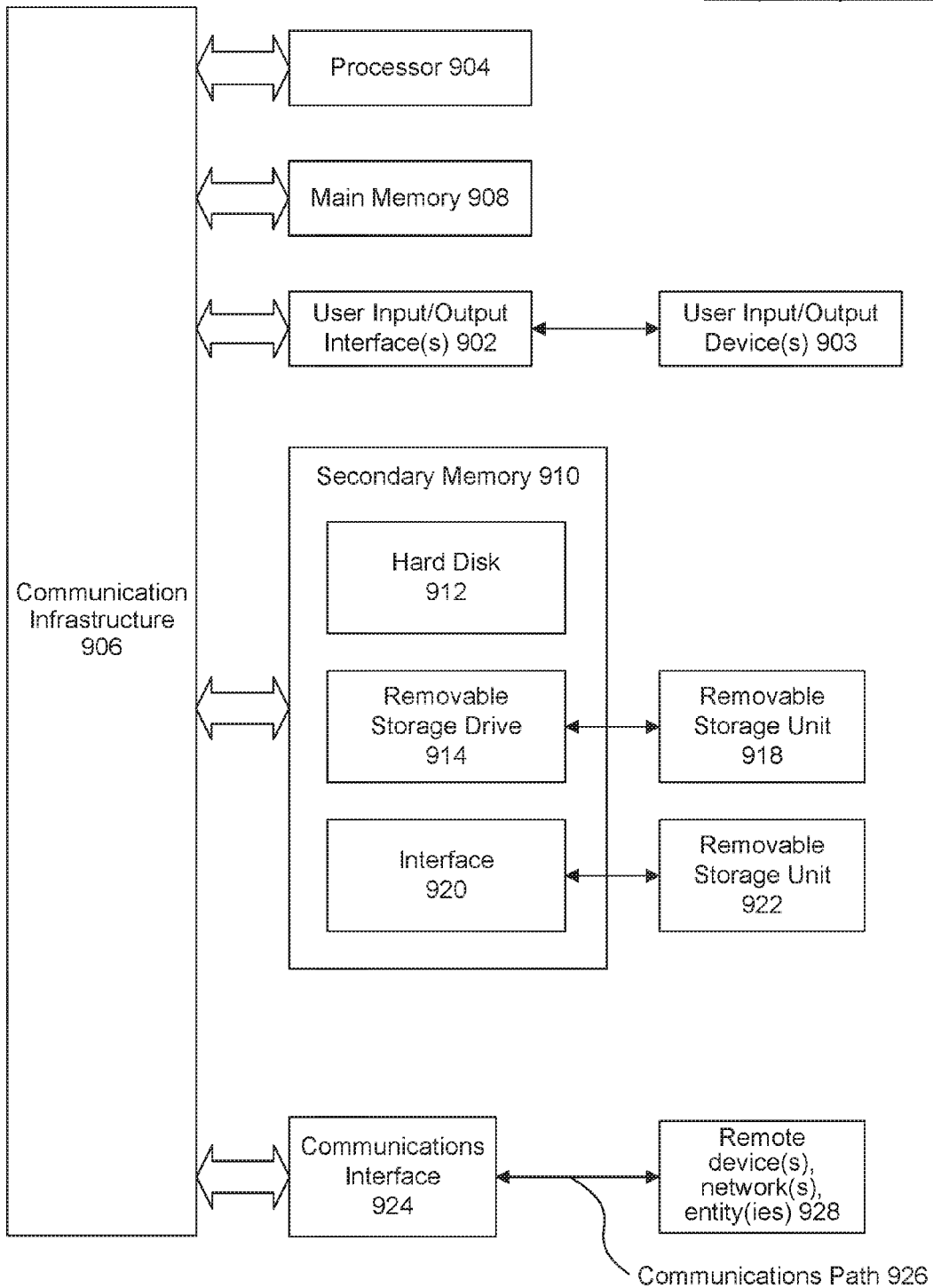
FIG. 9 is an example computer system useful for implementing various embodiments.

Various embodiments can be implemented, for example, using one or more computer systems, such as computer system 900 shown in FIG. 9. Computer system 900 can be used, for example, to implement method 400 of FIG. 4. For example, computer system 900 can determine a resource block allocation of a portion of a tone space using a lookup table. Computer system 900 can further map a plurality of tones to a resource block based on the determined resource block allocation, according to some embodiments. Computer system 900 can be any computer capable of performing the functions described herein.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method for specifying a desired range of values, the method comprising:
    displaying a range slider bar on a graphical user interface, wherein the range slider bar displays a first range of values including a first maximum and first minimum value for the first range of values, and wherein the range slider includes a first handle and a second handle for determining a second range of values within the first range of values, wherein the first handle indicates a second minimum value for the second range of values and wherein the second handle indicates a second maximum value for the second range of values;
    receiving a new position for at least one of the handles on the range slider bar, wherein the new position specifies a new second range of values within the first range of values, including at least one of a new second minimum value or a second maximum value;
    partitioning the new second range of values into a plurality of sub-ranges, wherein a first sub-range includes values from the first minimum to the second min, a second sub-range includes values from the second minimum to a midpoint between the second minimum and the second max, a third sub-range that includes values from the midpoint to the second max, and a fourth sub-range that includes values from the second maximum to the first maximum;
    determining a mapping between a set of accessible positions on the range slider bar and a plurality of values within the new second range of values, wherein, for each sub-range, a difference of values assigned to consecutive accessible positions corresponding to the sub-range increases exponentially when moving from a boundary value of the sub-range to another boundary value of the sub-range; and
    in response to identifying that the first range of values is identical to the desired range of values, terminating;
    wherein at least one of the displaying, receiving, partitioning, determining, and terminating are performed by one or more computers.

2. The method of claim 1, the determining further comprising:
    selecting a first sub-range from the plurality of sub-ranges, wherein the first sub-range comprises a first boundary value and a second boundary value;
    selecting a first number for accessible positions on the range slider bar corresponding to the first sub-range;
    determining a first set of accessible positions corresponding to the first sub-range, wherein a cardinality of the first set is the first number;
    for each accessible position within the first set, assigning a value within the first sub-range,
    wherein the first boundary value is assigned to a first accessible position within the first set, and the second boundary value is assigned to a second accessible position within the first set,
    wherein the difference of values assigned to the second accessible position and an accessible position adjacent to the second accessible position within the first set is one base unit, and wherein the difference of values assigned to the consecutive accessible positions increases by a constant factor when moving from the second accessible position to the first accessible position;
    for each sub-range in the plurality of sub-ranges other than the first sub-range:
    determining a second set of accessible positions on the range slider bar;
        assigning a value to each accessible position within the second set;
        wherein the difference of values assigned to consecutive accessible positions within the second set increases by the constant factor when moving from a boundary value of the sub-range to another boundary value of the sub-range;
        calculating a total number of accessible positions determined for the plurality of sub-ranges; and
        decreasing the first number in response to identifying that the total number is greater than a pre-determined value.

3. The method of claim 2, wherein the first sub-range covers a maximum number of base units among all sub-ranges.

4. The method of claim 2, wherein the base unit is adjusted based on the desired range of values within the second range.

5. The method of claim 2, wherein the value assigned to each accessible position is rounded to the closest base unit.

6. The method of claim 1, wherein the exponential increase is determined by a constant factor.

7. The method of claim 1, further comprising:
    determining a maximum number of accessible positions on the range slider bar.

8. A system for specifying a desired range of values, comprising:
    a memory;
    a graphical user interface; and
        at least one processor coupled to the memory and configured to:
    display a range slider bar on a graphical user interface, wherein the range slider bar displays a first range of values including a first maximum and first minimum value for the first range of values, and wherein the range slider includes a first handle and a second handle for determining a second range of values within the first range of values, wherein the first handle indicates a second minimum value for the second range of values and wherein the second handle indicates a second maximum value for the second range of values;
    receive a new position for at least one of the handles on the range slider bar, wherein the new position specifies a new second range of values within the first range of values, including at least one of a new second minimum value or a second maximum value;
    partition the new second range of values into a plurality of sub-ranges, wherein a first sub-range includes values from the first minimum to the second min, a second sub-range includes values from the second minimum to a midpoint between the second minimum and the second max, a third sub-range that includes values from the midpoint to the second max, and a fourth sub-range that includes values from the second maximum to the first maximum;

determine a mapping between a set of accessible positions on the range slider bar and a plurality of values within the new second range, wherein, for each sub-range, a difference of values assigned to consecutive accessible positions corresponding to the sub-range increases exponentially when moving from a boundary value of the sub-range to another boundary value of the sub-range; and terminate in response to an identification that the first range is identical to the desired range of values.

9. The system of claim 8, wherein to determine the mapping, the at least one processor is further configured to:

select a first sub-range from the plurality of sub-ranges, wherein the first sub-range comprises a first boundary value and a second boundary value;

select a first number for accessible positions on the range slider bar corresponding to the first sub-range;

determine a first set of accessible positions corresponding to the first sub-range, wherein a cardinality of the first set is the first number;

for each accessible position within the first set, assign a value within the first sub-range, wherein the first boundary value is assigned to a first accessible position within the first set, and the second boundary value is assigned to a second accessible position within the first set, wherein the difference of values assigned to the second accessible position and an accessible position adjacent to the second accessible position within the first set is one base unit, and wherein the difference of values assigned to the consecutive accessible positions increases by a constant factor when moving from the second accessible position to the first accessible position; and for each sub-range in the plurality of sub-ranges other than the first sub-range:

determine a second set of accessible positions on the range slider bar;

assign a value to each accessible position within the second set;

wherein the difference of values assigned to consecutive accessible positions within the second set increases by the constant factor when moving from a boundary value of the sub-range to another boundary value of the sub-range;

calculate a total number of accessible positions determined for the plurality of sub-ranges; and decrease the first number in response to identifying that the total number is greater than a pre-determined value.

10. The system of claim 9, wherein the first sub-range covers a maximum number of base units among all sub-ranges.

11. The system of claim 9, wherein the base unit is adjusted based on the desired range of values within the second range.

12. The system of claim 9, wherein the value assigned to each accessible position is rounded to the closest base unit.

13. The system of claim 8, wherein the exponential increase is determined by a constant factor.

14. A tangible computer-readable device having instructions stored thereon that, when executed by at least one computing device, causes the at least one computing device to perform operations for specifying a desired range of values, the operations comprising:

displaying a range slider bar on a graphical user interface, wherein the range slider bar displays a first range of values including a first maximum and first minimum value for the first range of values, and wherein the range slider includes a first handle and a second handle for determining a second range of values within the first range of values, wherein the first handle indicates a second minimum value for the second range of values and wherein the second handle indicates a second maximum value for the second range of values;

receiving a new position for at least one of the handles on the range slider bar, wherein the new position specifies a new second range of values within the first range of values, including at least one of a new second minimum value or a second maximum value;

partitioning the new second range of values into a plurality of sub-ranges, wherein a first sub-range includes values from the first minimum to the second min, a second sub-range includes values from the second minimum to a midpoint between the second minimum and the second max, a third sub-range that includes values from the midpoint to the second max, and a fourth sub-range that includes values from the second maximum to the first maximum;

determining a mapping between a set of accessible positions on the range slider bar and a plurality of values within the new second range, wherein, for each sub-range, a difference of values assigned to consecutive accessible positions corresponding to the sub-range increases exponentially when moving from a boundary value of the sub-range to another boundary value of the sub-range; and in response to identifying that the first range is identical to the desired range of values, terminating;

wherein at least one of the displaying, receiving, partitioning, determining, and terminating are performed by one or more computers.

15. The computer-readable device of claim 14, the determining further comprising:

selecting a first sub-range from the plurality of sub-ranges, wherein the first sub-range comprises a first boundary value and a second boundary value;

selecting a first number for accessible positions on the range slider bar corresponding to the first sub-range;

determining a first set of accessible positions corresponding to the first sub-range, wherein a cardinality of the first set is the first number;

for each accessible position within the first set, assigning a value within the first sub-range, wherein the first boundary value is assigned to a first accessible position within the first set, and the second boundary value is assigned to a second accessible position within the first set, wherein the difference of values assigned to the second accessible position and an accessible position adjacent to the second accessible position within the first set is one base unit, and wherein the difference of values assigned to the consecutive accessible positions increases by a constant factor when moving from the second accessible position to the first accessible position; and for each sub-range in the plurality of sub-ranges other than the first sub-range:

determining a second set of accessible positions on the range slider bar;

assigning a value to each accessible position within the second set;

wherein the difference of values assigned to consecutive accessible positions within the second set increases by the constant factor when moving from a boundary value of the sub-range to another boundary value of the sub-range;

calculating a total number of accessible positions determined for the plurality of sub-ranges; and decreasing the first number in response to identifying that the total number is greater than a pre-determined value.

16. The computer-readable device of claim 14, wherein the first sub-range covers a maximum number of base units among all sub-ranges.

17. The computer-readable device of claim 14, the displaying the range slider bar on the graphical user interface further comprising:

displaying a plurality of labels on the range slider bar, wherein each label corresponds to an accessible position and a value assigned to the accessible position.

* * * * *